United States Patent [19]
Mowrey et al.

[11] Patent Number: 5,500,649
[45] Date of Patent: Mar. 19, 1996

[54] METHOD AND APPARATUS FOR MONITORING THE THICKNESS OF A COAL RIB DURING RIB FORMATION

[75] Inventors: Gary L. Mowrey, Jefferson Boro; Carl W. Ganoe, Pittsburgh; William D. Monaghan, Dravosburg, all of Pa.

[73] Assignee: The United States of America as represented by the Secretary of the Interior, Washington, D.C.

[21] Appl. No.: 326,301

[22] Filed: Oct. 20, 1994

[51] Int. Cl.⁶ .................................................. G01S 13/02
[52] U.S. Cl. .................................................. 342/22
[58] Field of Search ................... 342/22, 118; 299/1.6

[56] References Cited

U.S. PATENT DOCUMENTS

| | | | |
|---|---|---|---|
| 4,297,699 | 10/1981 | Fowler et al. | 342/22 |
| 5,121,971 | 6/1992 | Stolarczyk | 299/1.6 |

*Primary Examiner*—Daniel T. Pihulic
*Attorney, Agent, or Firm*—E. Philip Koltos

[57] ABSTRACT

Apparatus for monitoring the position of a mining machine cutting a new entry in a coal seam relative to an adjacent, previously cut entry to determine the distance between a near face of the adjacent previously cut entry and a new face adjacent thereto of a new entry being cut by the mining machine which together define the thickness of a coal rib being formed between the new entry and the adjacent previously cut entry during the new entry-cutting operation. The monitoring apparatus; includes a transmit antenna mounted on the mining machine and spaced inwardly from the new face of the coal rib for transmitting radio energy towards the coal rib so that one portion of the radio energy is reflected by the new face which is defined at an air-coal interface between the new entry and the coal rib and another portion of the radio energy is reflected by the near face of the coal rib which is defined at an air-coal interface between the coal rib and the adjacent previously cut entry. A receive antenna mounted on the mining machine and spaced inwardly of the new face of the coal rib receives the one portion of the radio energy reflected by the new face and also receives the another portion of the radio energy reflected by the near face. A processor determines a first elapsed time period equal to the time required for the one portion of the radio energy reflected by the new face to travel between the transmit antenna and the receive antenna and also determines a second elapsed time period equal to the time required for the another portion of the radio energy reflected by the near face to travel between the transmit antenna and the receive antenna and thereafter calculates the thickness of the coal rib being formed as a function of the difference between the first and second elapsed time periods.

12 Claims, 2 Drawing Sheets

METHOD AND APPARATUS FOR MONITORING THE THICKNESS OF A COAL RIB DURING RIB FORMATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to a method and apparatus useful in a coal mining operation to monitor the thickness of a mine roof-supporting coal rib which separates adjacent entries cut into a coal seam and, more particularly, to a method and apparatus for monitoring the thickness of a coal rib during rib formation so that the thickness of the coal rib may be controlled.

2. Description of the Prior Art

In coal mining operations, and particularly in highwall mining operations, coal is removed from a coal seam by a highwall mining machine which utilized a cutting head located at the front end of the machine to dislodge coal from the seam as the mining machine advances into the seam. The dislodged coal is transferred from the entry by a continuous haulage conveyor system to a storage location for subsequent removal from the coal mine. As can be appreciated, the entire coal seam cannot be removed by the mining machine for a variety of reasons. One primary reason is that removal of the entire coal seam from its underground location will result in the removal of all support for the earthen "roof" or overburden above the coal seam. Obviously, with all support for the mine roof removed, mine personnel working in and around the coal seam would be placed in great jeopardy.

Since the entire coal seam cannot be removed from its underground location, coal is removed from the seam by operation of the highwall mining machine to cut a series of "entries" in the coal seam. In order to provide support for the mine roof during the process of removing coal from the coal seam, each newly cut entry in the seam is separated from the previously cut entry by a selected distance so that a "rib" of coal remains after the newly cut entry is completed. The coal rib extends from the mine floor to the mine roof, and the series of coal ribs formed as multiple entries are cut in the coal seam act as roof support pillars.

Since coal ribs play such a critical role in providing a safe environment for personnel working in and around the coal seam, mine operators have been searching for a cost-effective method and apparatus for maintaining a constant coal rib thickness so that their equipment will not punch through a previously cut, adjacent entry during a new entry-cutting operation and become stuck between adjacent entries. In addition, operators have been searching for a way to maintain a constant coal rib thickness since if a coal rib is too thin it will not provide adequate support for the roof above the coal seam, and, conversely, if the rib is too wide, those coal resources associated with the coal rib become permanently sterilized (rendered inaccessible and unrecoverable).

Presently, highwall mine operators do not have a convenient, cost-effective method for monitoring coal rib thickness. One way operators now monitor coal rib thickness is to drill horizontal holes through the rib, which requires that the roof adjacent to the rib first be supported so that a drilling operator can perform the drilling operation. This method is very costly and time-consuming since the mining machine must be stopped in order to allow the measurement hole to be drilled and the thickness measurement made. More importantly, the drilling operation is unsafe since it requires that the drilling operator be placed in close proximity to the highwall mining machine and directly under a portion of the mine roof that is only temporarily supported. In order to provide some reasonable assurance that the thicknesses of coal ribs between adjacent mine entries are sufficient to provide adequate roof support, current practice requires that accurate survey measurements of the coal seam be made and that the highwall mining machine be aligned properly with respect to these survey measurements. Although these precise survey measurements are presently routinely made, they are only of limited value due to current technology limitations which limit the depth of penetration of a cut into the coal seam. For example, directional inaccuracies in the movement of the highwall mining machine may cause adjacent entries to intersect resulting in an area of unsupported mine roof which may collapse onto the highwall mining machine. In addition, both the coal geology and the operating characteristics of the mining machine will affect how well the mining machine will track the previous cut.

As can be seen from the foregoing, although equipment and methods exist for monitoring the thickness of a coal rib formed between adjacent entries cut in a coal seam they are not without their shortcomings. Consequently, there is a need for an improved apparatus and method for monitoring the thickness of a coal rib which does not require the mining operation to be suspended in order for the measurement to be made and eliminates the safety hazards associated with presently known and utilized equipment and methods. The improved method and apparatus for implementing the method should be capable of monitoring the thickness of a coal rib during rib formation so that the operation of the mining machine may be adjusted on a real time basis to instantaneously control the thickness of the coal rib to any desired thickness.

SUMMARY OF THE INVENTION

The present invention relates to an apparatus and method for monitoring the thickness of a coal rib formed during an underground highwall mining operation designed to satisfy the aforementioned needs. The apparatus and method of the present invention eliminate the need for drilling horizontal rib thickness-measurement holes and thus eliminate the need for providing temporary roof support for the drilling operator. In addition, the apparatus and method of the present invention allow coal removal to continue since the thickness of a coal rib may be monitored on a real time basis. Finally, the present invention may be used to control rib thickness by providing real time information to a mining machine operator regarding the actual thickness of a coal rib during rib formation so that mining machine movement within a mine entry may be altered to adjust coal rib thickness while the coal mining operation continues.

Accordingly, the present invention is directed to an apparatus for monitoring the position of a mining machine cutting a new entry in a coal seam relative to an adjacent, previously cut entry to determine the thickness of a coal rib formed between the new entry and an adjacent entry during the new entry-cutting operation. The apparatus includes: (a) transmitting means mounted on the mining machine for transmitting radio energy towards the coal rib so that a portion of the radio energy is reflected at an air-coal interface between the new entry and the coal rib and a portion of the radio energy is reflected at an air-coal interface between the coal rib and the adjacent entry; (b) receiving means mounted on the mining machine for receiving the portion of the radio energy reflected at the air-coal interface between the new entry and the coal rib and for receiving the portion of the radio energy reflected at the air-coal interface between the coal rib and the adjacent entry; and (c) processor means for determining a first elapsed time period equal to the time required for the portion of the radio energy reflected at the air-coal interface between the new entry and the coal rib to travel between the transmitting means and the receiving means and for determining a second elapsed time period equal to the time required for the portion of the radio energy reflected at the air-coal interface between the coal rib and the adjacent entry to travel between the transmitting means and the receiving means and for calculating the thickness of the coal rib as a function of the difference between the first and second elapsed time periods.

Further in accordance with the present invention, there is provided apparatus for determining the position of a mining machine cutting a new entry in a coal seam relative to an adjacent, previously cut entry to allow an operator of the mining machine to control the thickness of a coal rib formed between the new entry and the adjacent entry during the new entry-cutting operation. The apparatus includes: (a) transmitting means mounted on the mining machine for transmitting radio energy towards the coal rib so that a portion of the radio energy is reflected at an air-coal interface between the new entry and the coal rib and a portion of the radio energy is reflected at an air-coal interface between the coal rib and the adjacent entry; (b) receiving means mounted on the mining machine for receiving the portion of the radio energy reflected at the air-coal interface between the new entry and the coal rib and for receiving the portion of the radio energy reflected at the air-coal interface between the coal rib and the adjacent entry; (c) processor means for determining a first elapsed time period equal to the time required for the portion of the radio energy reflected at the air-coal interface between the new entry and the coal rib to travel between the transmitting means and the receiving means and for determining a second elapsed time period equal to the time required for the portion of the radio energy reflected at the air-coal interface between the coal rib and the adjacent entry to travel between the transmitting means and the receiving means and for calculating the thickness of the coal rib as a function of the difference between the first and second elapsed time periods; and (d) display means forming a portion of said processor means for providing to an operator of the mining machine indicia of the thickness of the coal rib during the new entry-cutting operation to allow the operator to control the position of the mining machine relative to the adjacent entry and thereby control the thickness of the coal rib.

Finally in accordance with the present invention, there is provided a method for monitoring the position of a mining machine cutting a new entry in a coal seam relative to an adjacent, previously cut entry to determine the thickness of a coal rib formed between the new entry and an adjacent entry during the new entry-cutting operation. The method includes the steps of: (a) transmitting radio energy from a location adjacent to a mining machine towards the coal rib so that a portion of the radio energy is reflected at an air-coal interface between the new entry and the coal rib and a portion of the radio energy is reflected at an air-coal interface between the coal rib and the adjacent entry; (b) receiving at a location adjacent to the mining machine the portion of the radio energy reflected at the air-coal interface between the new entry and the coal rib and the portion of the radio energy reflected at the air-coal interface between the coal rib and the adjacent entry; (c) determining a first elapsed time period equal to the time required for the portion of the radio energy reflected at the air-coal interface between the new entry and the coal rib to travel between the transmitting means and the receiving means; (d) determining a second elapsed time period equal to the time required for the portion of the radio energy reflected at the air-coal interface between the coal rib and the adjacent entry to travel between the transmitting means and the receiving means; and (e) calculating the thickness of the coal rib as a function of the difference between the first and second elapsed time periods.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In General

Figure 1:
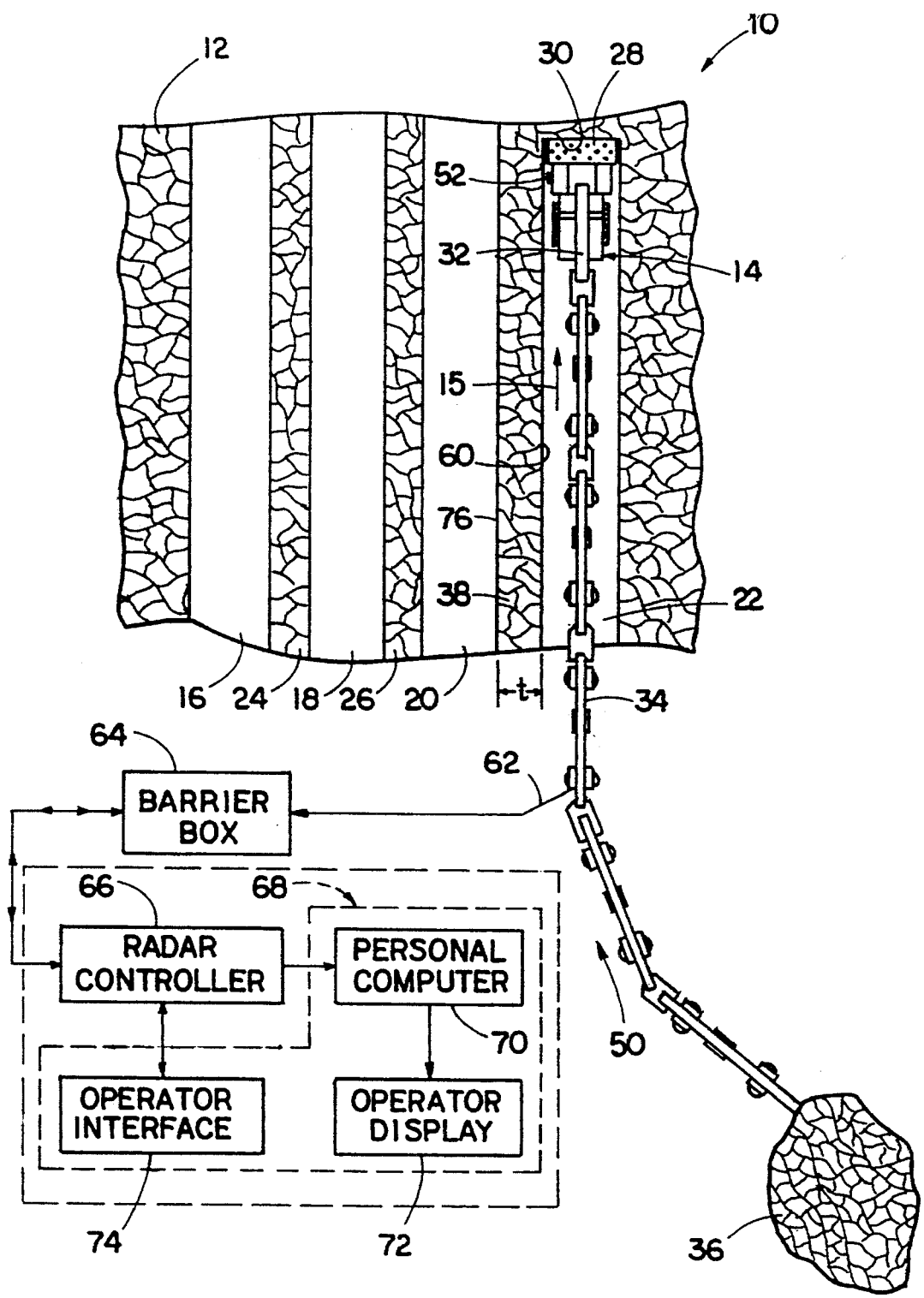
FIG. 1 is top plan view, partially in section, of a highwall mining operation including a series of entries each cut in a coal seam and separated by a coal rib, and illustrating the apparatus of the present invention operable to monitor the thicknesses of the coal ribs formed in the coal seam on a real time basis.

Now referring to the drawings, and particularly to FIG. 1, there is illustrated a top plan view, partially in section, of a highwall mining operation generally designated by the numeral 10. In the mining operation 10, coal is removed from a coal seam 12 by a mining machine such as a conventional highwall mining machine 14. In operation, the mining machine 14 removes coal from the coal seam 12 by cutting a series of "entries" in the seam 12 and transferring the coal removed as each entry is cut to a location away from the seam 12 for further processing. For example, as illustrated in FIG. 1 the mining machine 14 has already cut entries 16, 18 and 20 in the coal seam 12 and is in the process of cutting a new entry 22 in the coal seam 12. The entries 16, 18 are separated by a coal rib 24 and the entries 18, 20 are separated by a coal rib 26. The coal ribs 24, 26 are actually unmined coal and are required as in any highwall mining operation to provide support for the earthen roof above the coal seam 12 (earthen roof not shown).

As seen in FIG. 1, the new entry 22 is cut in the coal seam 12 by the advancement of the mining machine 14 into the coal seam 12 in a direction indicated by the directional arrow 15. A cutting head 28 located at the front end of the mining machine 14 operates to remove coal from coal face 30 directly adjacent the cutting head 28. As coal is removed by operation of the cutting head 28, it is transferred via a conveyor belt system 32 on the mining machine 14 to a continuous haulage system 34. The continuous haulage system 34 transports the removed coal from the new entry 22 and deposits it outside of the new entry 22 at a storage location 36. From the storage location 36, the removed coal may be transported above-ground by any suitable means.

As the new entry 22 is cut in the coal seam 12 by operation of the mining machine 14, a coal rib 38 is formed which separates the new entry 22 from the adjacent, previously cut entry 20. As can be appreciated, it would be advantageous to control the thickness "t" of the coal rib 38 by controlling the movement of the mining machine 14 as it advances into the new entry 22. Controlling the thickness "t" of the coal rib 38 would on the one hand, eliminate problems presently experienced with overly thin ribs and mining machine "punch throughs" into the adjacent entry 20 during the formation of the new entry 22, and on the other hand, would ensure that coal resources are not wasted by the formation of a coal rib such as the coal rib 38 which is thicker than required to provide adequate mine roof support.

APPARATUS AND METHOD OF THE PRESENT INVENTION

Figure 2:
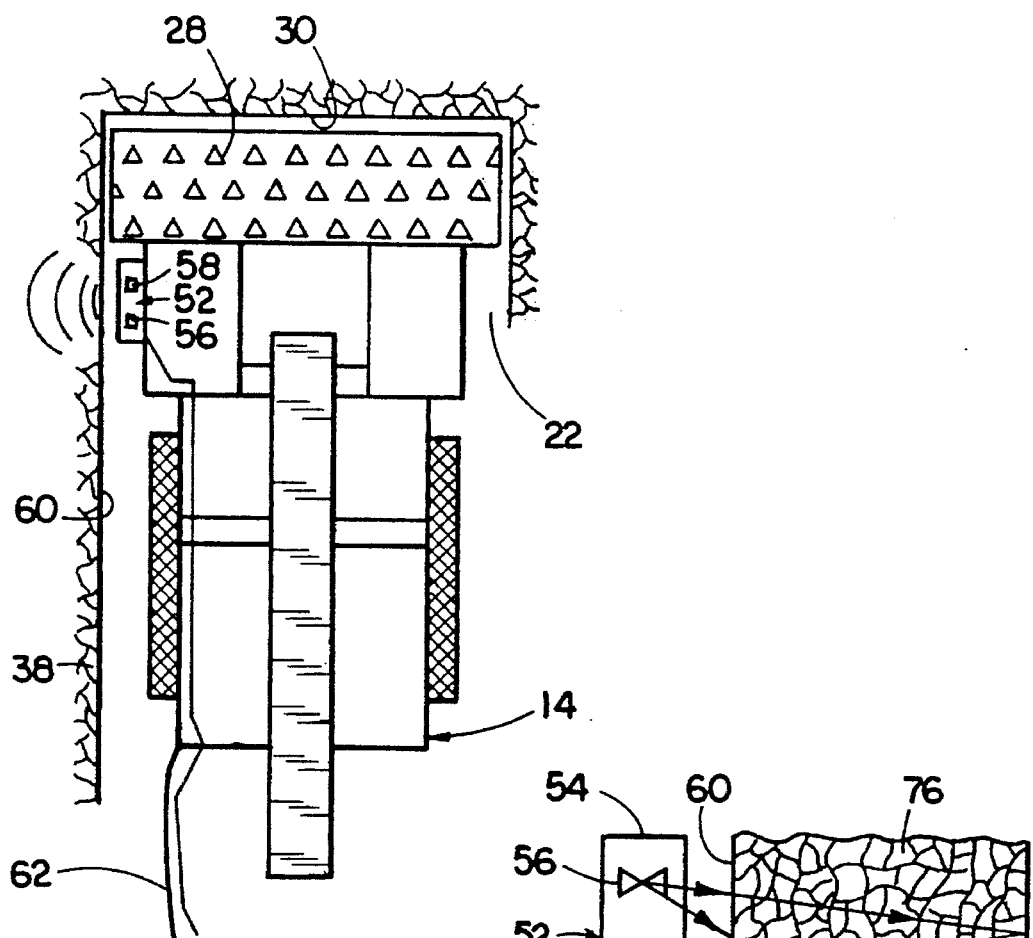
FIG. 2 is a top view of a conventional highwall mining machine positioned in a mine entry, illustrating radar transmitting and receiving equipment which forms a portion of the coal rib thickness monitoring apparatus of the present invention mounted on the mining machine adjacent to the air-coal interface between the mine entry and a coal rib.

Referring to FIGS. 1 and 2, there is illustrated the apparatus of the present invention 50 operable to monitor the thickness "t" of the coal rib 38 as the coal rib 38 is formed during operation of the mining machine 14 to cut the new entry 22 in the coal seam 12. Since the monitoring apparatus 50 of the present invention monitors the thickness "t" of the coal rib 38 on a real time basis, adjustments in the movement of the mining machine 14 within the new entry 22 may be made by the mining machine operator to ensure that the thickness of the coal rib 38 remains relatively constant at the desired value of thickness "t".

The monitoring apparatus 50 of the present invention includes an antenna assembly 52, illustrated generally in FIG. 1 and in more detail in FIG. 2, mounted on the side of the mining machine 14 in a protected enclosure 54 and near the mining machine's cutting head 28. In particular, the antenna assembly 52 includes radar transmit and receive broadband bow-tie antennas 56, 58 positioned in the enclosure 54 on the side of the mining machine 14 to be disposed between the mining machine 14 and spaced inwardly from the air-coal interface 60 (new face of coal rib 38) between the new entry 22 and the coal rib 38. An electrical multiconductor antenna cable 62 connects the radar transmit and receive broadband bow-tie antennas 56, 58 to a barrier box 64 located outside the new entry 22. The barrier box 64 provides electrical isolation between the antenna assembly 52 and the remainder of the monitoring apparatus 50. Other components of the monitoring apparatus 50 include a radar controller 66 and a processor 68, which itself includes a personal computer 70, operator display 72 and an operator interface 74.

In operation, the radar controller 66 sends radio energy in the form of radar pulses preferably in the range of between 100–1000 MHz through the barrier box 64 to the transmit antenna 56. The radar controller 66 also sends radio energy in the form of a "transmit pulse" to the personal computer 70 each time radar pulses are sent to the transmit antenna 56. The radar pulses sent to the transmit antenna 56 leave the transmit antenna 56 and propagate through the air to the air-coal interface 60 (new face) between the new entry 22 and the coal rib 38. Some of the transmitted radar energy is reflected at the air-coal interface 60 and is detected after reflection by the receive antenna 58. Another portion of the transmitted radar energy passes through the entire thickness "t" of the coal rib 38 and a second reflection is produced at the air-coal interface 76 (near face of coal rib 38); between the previously cut entry 20 and the coal rib 38. This second reflection is also detected by the receive antenna 58, although it is at a reduced amplitude, depending upon the thickness and the dielectric properties of the coal and other geological materials present in the coal rib 38. The radar energy reflected at the air-coal interface 60 is detected by the receive antenna 58 and transferred from the receive antenna 58 to the barrier box 64 via the electrical multiconductor cable 62. Likewise, the radar energy reflected at the air-coal interface 76 (near face) is detected by the receive antenna 58 and transferred from the receive antenna 58 to the barrier box 64 via the electrical multiconductor cable 62. The barrier box 64 provides electrical isolation between the radar controller 66 and the transmit and receive antennas 56, 58. The radar energy reflected at the air-coal interface 60 and the radar energy reflected at the air-coal interface 76 are transferred from the barrier box 64 through the radar controller 66 and to the personal computer 70 which forms a portion of the processor 68.

Figure 3:
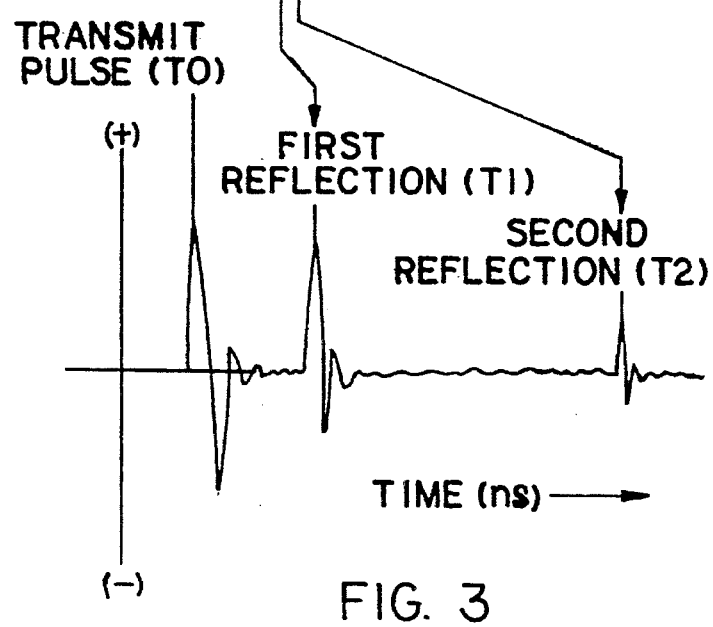
FIG. 3 is a graphic illustration of how the coal rib thickness monitoring apparatus of the present invention utilizes radio energy to determine the thickness of a coal rib.

Within the personal computer 70, a first elapsed time period is determined and is equal to the time between the receipt by the personal computer 70 of the "transmit pulse" referred to above and the receipt by the personal computer 70 of the radar energy reflected at the air-coal interface 60. This first elapsed time period represents the time required for the portion of the radar energy reflected at the air-coal interface 60 to travel between the transmit antenna 56 and the receive antenna 58. The first elapsed time period is graphically illustrated in FIG. 3. As seen in FIG. 3, radar energy propagates from the transmit antenna 56 at a time ($T_0$) and a portion of the propagated energy is reflected at the air-coal interface 60 at a time ($T_1$), Thus, the radar energy requires a time period equal to ($T_1$)–($T_0$) to reach the air-coal interface 60. From the illustration in FIG. 3, it is apparent that the first elapsed time period referred to herein is equal to the round trip time period for energy reflected at the air-coal interface 60 to travel between the transmit antenna 56 and the receive antenna 58 and is equal to $2 \times [(T_1)-(T_0)]$.

Within the personal computer 70, a second elapsed time is also determined and is equal to the time between the receipt by the personal computer 70 of the "transmit pulse" referred to above and the receipt by the personal computer 70 of the radar energy reflected at the air-coal interface 76. This second elapsed time period represents the time required for the portion of the radar energy reflected at the air-coal interface 76 to travel between the transmit antenna 56 and the receive antenna 58. The second elapsed time period is graphically illustrated in FIG. 3. As seen in FIG. 3, radar energy propagates from the transmit antenna 56 at a time ($T_0$) and a portion of the propagated energy passes through the air-coal interface 60 and is reflected at the air-coal interface 76 at a time ($T_2$). Thus, the radar energy requires a time period equal to ($T_2$)–($T_0$) to reach the air-coal interface 76. From the illustration in FIG. 3, it is apparent that the second elapsed time period referred to herein is equal to the round trip time period for energy reflected at the air-coal interface 76 to travel between the transmit antenna 56 and receive antenna 58 and is equal to $2 \times [(T_2)-(T_0)]$.

Within the personal computer 70, the thickness "t" of the coal rib 38 is calculated as a function of the difference between the first and the second elapsed time periods. For example, if it is assumed that the two way travel time for radar waves through coal is approximately 4.5 nanoseconds/foot, then the thickness "t" of the coal rib 38 may be calculated based on the 4.5 nanoseconds/foot value and the absolute value of the time difference between the first elapsed time period and the second elapsed time period. The operator of the mining machine 14 may use the operator interface 74 to control process variables such as the number of radar pulses per second generated by the radar controller 66 and the number of radar scans made by the personal computer 70. In addition, the mining machine 14 operator may use the operator interface 74 to place boundaries on the data, e.g., when ($T_0$) begins and when to begin looking for peak values of the first and second reflections ($T_1$) and ($T_2$).

The processor 68 also includes an operator display 72 which provides visual indicia of the thickness "t" of the coal rib 38 as calculated within the personal computer 70. Since the mining machine 14 operator may observe the thickness "t" of the coal rib 38 as the coal rib 38 is being formed by observing the operator display 72, the operator is capable of controlling the position of the mining machine 14 within the new entry 22 in order control the value of the thickness "t".

The monitoring apparatus 50 of the present invention is generic in that any commercially available pulse-based radar system that operates in the 100–1000 MHz range can be used, provided that the antenna assembly 52 is MSHA approved, and that standard serial and/or parallel communications between the radar controller 66 and the processor 68 exist so that radar data can be downloaded into the personal computer for processing in real time. The mining machine 14 is also generic in that any commercially available mining machine that is capable of being controlled in terms of its azimuth and/or lateral movement within the new entry 22 may be used with the monitoring apparatus 50. Good practice dictates that, in addition to the antenna assembly 52, all other underground components be MSHA approved.

A basic procedure for using the monitoring apparatus 50 of the present invention consists of installing the MSHA approved radar antenna assembly 52 on the highwall mining machine 14 as near as practical to the cutting head 28. Another important consideration is to position the antenna assembly 52 as close to the coal rib 38 as possible in order to maximize the amount of radar energy that can be transferred into the coal rib 38. A third consideration is to have the antenna assembly 52 mounted on the mining machine 14 so that the antenna assembly 52 is positioned around the cleanest coal in the seam. In order to most effectively utilize the monitoring apparatus 50 of the present invention, the mining machine 14, after mining a first entry in the coal seam 12 without guidance, is aligned parallel to the first entry. The mining machine 14 then begins cutting into the second entry, again without guidance, until the radar antenna is inside the entry at least ten (10) feet. The mining machine operator then adjusts the radar controller 66 to obtain a good radar reflection from the other side of the coal rib. A good radar reflection signal is needed for this method to work most successfully. Typical radar parameters would be 16-bit, data, 512 data points/scan and 30 scans/second. Assuming a two-way travel time of 4.5 nanoseconds/foot through coal and having a 5 foot rib, the total travel time should be on the order of 22.5 nanoseconds. The operator would then have his personal computer begin reading this radar data and computing the coal rib thickness. If the computed coal rib thickness is acceptable, the operator could begin to perform his normal highwall mining activities. If it is not acceptable, the operator must determine if the radar signal looks normal based on previous experience. If it does not look normal, the operator should try readjusting the radar for a good return reflection in the expected time window (e.g., 22.5 nanoseconds for a 5 foot coal rib). If the signal appears acceptable and it is arriving at the expected time, then either the amplitude threshold may not be properly set, or the two-way travel time should be changed to give the proper coal rib thickness.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. Apparatus for monitoring the position of a mining machine cutting a new entry in a coal seam relative to an adjacent, previously cut entry to determine the distance between a near face of the adjacent previously cut entry and a new face adjacent thereto of a new entry being cut by the mining machine which together define the thickness of a coal rib being formed between said new entry and said adjacent previously cut entry during the new entry-cutting operation, comprising:

(a) transmitting means mounted on said mining machine and spaced inwardly from said new face of said coal rib for transmitting radio energy towards said coal rib so that one portion of said radio energy is reflected by said new face which is defined at an air-coal interface between said new entry and said coal rib and another portion of said radio energy is reflected by said near face which is defined at an air-coal interface between said coal rib and said adjacent previously cut entry;

(b) receiving means mounted on said mining machine and spaced inwardly from said new face of said coal rib for receiving said one portion of said radio energy reflected by said new face and for receiving said another portion of said radio energy reflected by said near face; and (c) processor means for determining a first elapsed time period equal to the time required for said one portion of said radio energy reflected by said new face to travel between said transmitting means and said receiving means and for determining a second elapsed time period equal to the time required for said another portion of said radio energy reflected by said near face to travel between said transmitting means and said receiving means and for calculating the thickness of said coal rib as a function of the difference between said first and second elapsed time periods.

2. The apparatus as recited in claim 1, which further includes a radar controller for providing said radio energy to said transmitting means and for transferring said one portion and said another portion of said radio energy received by said receiving means to said processor means.

3. The apparatus as recited in claim 2, wherein said radar controller provides said one portion and said another portion of said radio energy to said transmitting means in the form of radar pulses in the 100–1000 MHz range.

4. The apparatus as recited in claim 2, which further includes a barrier box electrically disposed between said radar controller and said transmitting and receiving means to provide electrical isolation between said radar controller and said transmitting and receiving means.

5. The apparatus as recited in claim 2, wherein said transmitting means and said receiving means are each housed in an enclosure secured to said mining machine.

6. The apparatus as recited in claim 5, wherein said transmitting means and said receiving means are each bow-tie antennas.

7. The apparatus as recited in claim 2, wherein said processor means is a personal computer.

8. The apparatus as recited in claim 7, wherein said processor means includes display means for providing to an operator of said mining machine visual indicia of the thickness of said coal rib formed between said new face of said new entry and said near face of said adjacent previously cut entry during said new entry-cutting operation to allow said operator to control the position of said mining machine relative to said adjacent previously cut entry based on said visual indicia to thereby control the thickness of said coal rib being formed.

9. The apparatus as recited in claim 7, wherein said processor means includes an operator interface electrically connected with said radar controller and operable to allow selective adjustment of the frequency of said radio energy produced by said radar controller.

10. Apparatus for determining the position of a mining machine cutting a new entry in a coal seam relative to an adjacent, previously cut entry to allow an operator of said mining machine to control the distance between a near face of the adjacent previously cut entry and a new face adjacent thereto of a new entry being cut by the mining machine which together define the thickness of a coal rib being formed between said new entry and said adjacent previously cut entry during the new entry-cutting operation, comprising:

(a) transmitting means mounted on said mining machine and spaced inwardly from said new face of said coal rib for transmitting radio energy towards said coal rib so that one portion of said radio energy is reflected by said new face which is defined at an air-coal interface between said new entry and said coal rib and another portion of said radio energy is reflected by said near face which is defined at an air-coal interface between said coal rib and said adjacent previously cut entry;

(b) receiving means mounted on said mining machine and spaced inwardly from said new face of said coal rib for receiving said one portion of said radio energy reflected by said new face and for receiving said another portion of said radio energy reflected by said near face;

(c) processor means for determining a first elapsed time period equal to the time required for said one portion of said radio energy reflected by said near face to travel between said transmitting means and said receiving means and for determining a second elapsed time period equal to the time required for said another portion of said radio energy reflected by said near face to travel between said transmitting means and said receiving means and for calculating the thickness of said coal rib measured between said new face and said near face as a function of the difference between said first and second elapsed time periods; and (d) display means forming a portion of said processor means for providing to an operator of said mining machine visual indicia of the thickness of said coal rib formed between said new face of said new entry and said near face of said adjacent previously cut entry during said new entry-cutting operation to allow said operator to control the position of said mining machine relative to said adjacent previously cut entry based on said visual indicia to thereby control the thickness of said coal rib being formed.

11. A method for monitoring the position of a mining machine cutting a new entry in a coal seam relative to an adjacent, previously cut entry to determine the distance between a near face of the adjacent previously cut entry and a new face adjacent thereto of a new entry being cut by the mining machine which together define the thickness of a coal rib being formed between said new entry and said adjacent previously cut entry during the new entry-cutting operation, comprising the steps of:

(a) transmitting radio energy from a location spaced inwardly from said new face of said coal rib towards said coal rib so that one portion of said radio energy is reflected by said new face which is defined at an air-coal interface between said new entry and said coal rib and another portion of said radio energy is reflected by said near face which is defined at an air-coal interface between said coal rib and said adjacent previously cut entry;

(b) receiving at a location spaced inwardly from said new face of said coal rib said one portion of said radio energy reflected by said new face and said another portion of said radio energy reflected by said near face;

(c) determining a first elapsed time period equal to the time required for said one portion of said radio energy reflected by said new face to travel between said transmitting step and said receiving step;

(d) determining a second elapsed time period equal to the time required for said another portion of said radio energy reflected by said near face to travel between said transmitting step and said receiving step; and (e) calculating the thickness of said coal rib between said new face and said near face as a function of the difference between said first and second elapsed time periods.

12. The method as recited in claim 11, further including providing to an operator of said mining machine visual indicia of the thickness of said coal rib formed between said new face of said new entry and said near face of said adjacent previously cut entry during said new entry-cutting operation to allow said operator to control the position of said mining machine relative to said adjacent previously cut entry based on said visual indicia to thereby control the thickness of said coal rib being formed.

* * * * *